Aug. 2, 1960

G. H. SCHWUTTKE ET AL 2,947,214

CRYSTAL ORIENTATION DEVICE

Filed June 2, 1958

INVENTOR.
GUNTER H. SCHWUTTKE
EDGAR D. HAFFNER
RALPH M. ADLER

BY *Theodore Joy Jr*

ATTORNEY

United States Patent Office 2,947,214
Patented Aug. 2, 1960

2,947,214

CRYSTAL ORIENTATION DEVICE

Gunter H. Schwuttke, Flushing, Edgar D. Haffner, Williston Park, and Ralph Michael Adler, Kew Gardens, N.Y., assignors, by mesne assignments, to Sylvania Electric Products Inc., Wilmington, Del., a corporation of Delaware Filed June 2, 1958, Ser. No. 739,140
2 Claims. (Cl. 88—14)

Our invention relates to a method and apparatus for determining the orientation of various crystallographic planes in crystalline materials.

When working with crystalline substances such as germanium and silicon, it is often necessary to determine the unknown direction of a given crystallographic plane with respect to a plane of reference, for example, with respect to a planar surface of the substance. The term "crystallographic planes" refers to those particular planes of a crystalline substance as determined by the Miller Index method, well known in that branch of physics relating to crystals and their structure.

The prior art has knowledge of various techniques employed to determine the direction of a given crystallographic plane of a crystalline substance. There are, however, inherent disadvantages to these techniques, among which are high cost of the equipment required, time consuming data obtaining procedure and data computation, the necessary use of skilled personnel and the requirement of a darkened room in order to obtain the data with present techniques.

We have invented a device for rapidly and accurately determining crystal orientation which overcomes these disadvantages.

Accordingly it is an object of this invention to provide new and improved apparatus for determining the orientation of various planes of a crystalline substance such as germanium or silicon with respect to a surface of said substance.

Another object is to ascertain exact orientation of various crystallographic planes of a crystalline substance by means of inexpensive equipment.

A further object is to determine the direction of a given plane of a crystalline material with a high degree of facility and accuracy to then produce small pieces of such material by cutting along said plane.

A still further object is to determine the exact orientation of various planes of a crystalline substance in a rapid and efficient manner and by the use of unskilled personnel.

Yet a further object is to eliminate the necessity of conducting the orientation determination in a darkened room as heretofore required.

These and other objects of our invention will either be explained or will become apparent hereinafter.

In accordance with the principles of our invention, we provide apparatus for determining the orientation of the crystallographic planes of a specimen of crystalline substance such as germanium or silicon with respect to planar surface thereof. The apparatus includes a movable assembly for defining first, second and third mutually orthogonal fixed axes, about each of which a first, second and third subassembly of said assembly can be respectively rotated.

Means fixed with respect to said three axes direct a beam of light upon a prepared planar surface of the crystal specimen which is mounted on said assembly. This light is reflected from the planar surface in the form of a light pattern and is intercepted by a screen positioned in its path.

In accordance with the method herein set forth, the position of the specimen is varied by displacing a selected one or more of said subassemblies from their reference positions as required to thereby center the light pattern with respect to a reference point on the screen. The angular deviation and direction of a selected crystallographic plane of the specimen with respect to its planar surface is directly related to the deviations of the various subassemblies from their reference positions and can be determined by noting these latter deviations on dials provided therefor on each subassembly.

Preliminary to mounting the crystal specimen on the assembly, a center point of reference must first be established on the screen. With the three subassemblies maintained in their zero or reference positions, this reference point is determined by first positioning a plane mirror on the third subassembly so that its reflecting surface passes through the intersection of the three axes, then directing the beam of light upon this surface, and then marking the center of reflection of the beam on the screen; the mirror is then removed. Perpendicular lines are then marked on the screen, one line lying parallel to the plane formed by the intersection of the first and third axes, the other line being parallel to the second axis.

In carrying out our method, the crystal specimen of either germanium or silicon, for example, is first prepared to have a planar surface. This surface is then etched with a suitable etchant to produce a surface having microscopic etch pits. The configuration and general pattern of these etch pits vary with the direction of the planar surface with respect to a selected crystallographic plane. The specimen is then mounted on the third subassembly with its planar surface passing through the point of intersection of said three axes and oriented in the same direction in which the mirror was mounted during the screen reference point determining procedure.

By directing the light beam on the etched planar surface, a certain light pattern will be observed on the screen. Each crystallographic plane will reflect a light pattern characteristic of that plane. If the light pattern viewed on the screen is symmetrical in shape and its center is coincident with the reference point on the screen, then the crystallographic plane represented by the light pattern is coincident with or parallel to the planar surface.

If this is not the case, one of two methods may be followed to determine the direction of the crystallographic plane indicated by the light pattern on the screen. By one method the third subassembly is rotated until the center of the light pattern is bisected by one of the perpendicular lines on the screen. The appropriate first or second subassembly is then displaced about its respective axis until the other of the perpendicular lines is bisected. The deviation of this subassembly from its reference position will then be the exact angular deviation of the crystallographic plane with respect to the planar surface.

By the other method one or more of the subassemblies as may be required are displaced from their reference positions until the center of the pattern coincides with the reference point on the screen. By then observing the amount of angular deviation of the assembly or assemblies from their reference positions, the exact direction and angular deviation of the crystallographic plane with respect to the planar surface can be determined.

Illustrative embodiments of my invention will now be described in detail with reference to the accompanying drawings wherein Fig. 1 is a perspective view of the apparatus used in carrying out my invention;

Figure 1:
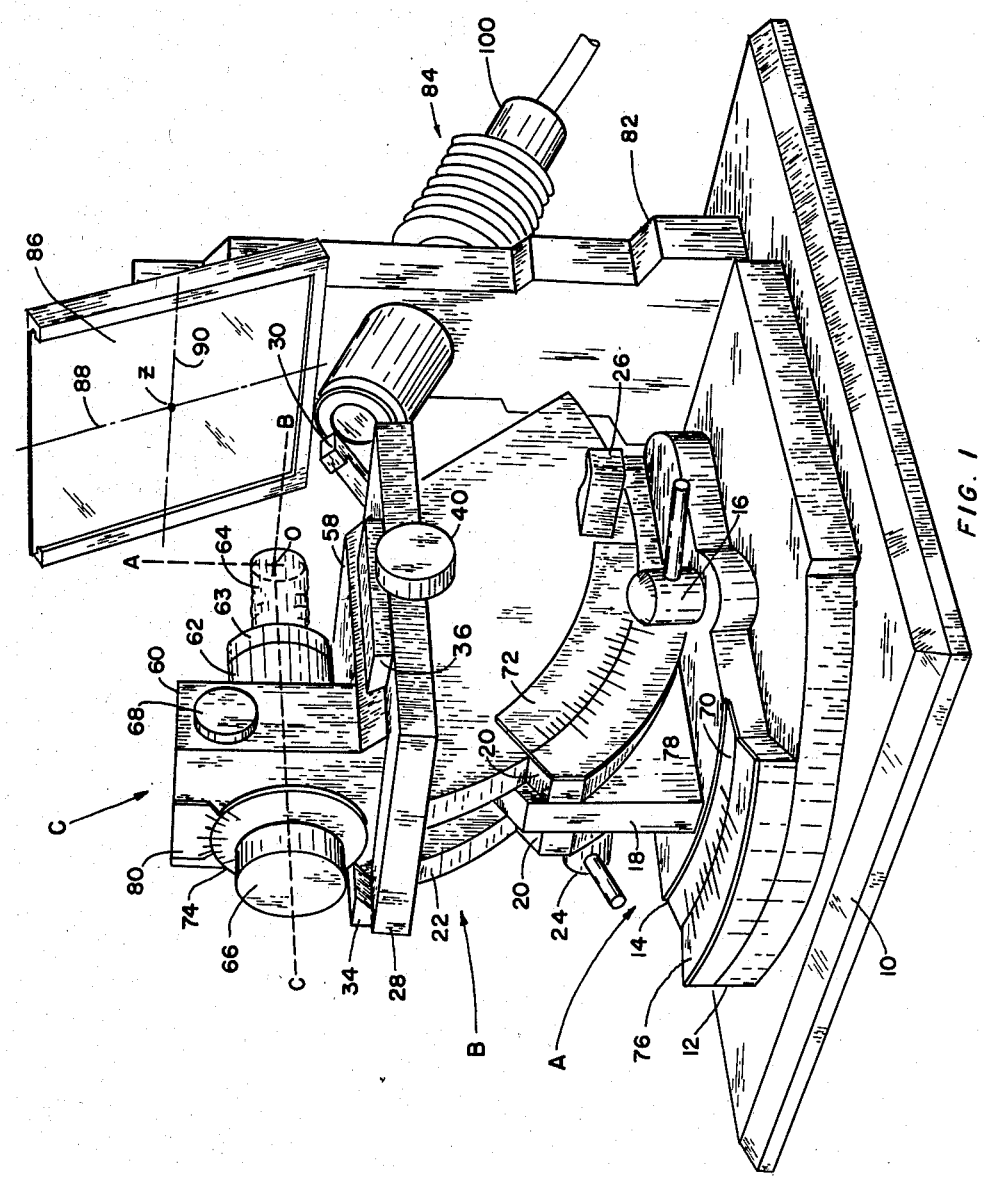

Referring now to Fig. 1, there is shown a platform 10 upon which is mounted a goniometer assembly specially designed to meet the needs of the method herein described. The goniometer comprises a first subassembly A rotatable about a first or vertical axis O—A, a second subassembly B rotatable about a second or horizontal axis O—B, and a third subassembly C rotatable about a third axis O—C, also horizontal. The three axes O—A, O—B and O—C are mutually orthogonal and intersect at the point O.

The subassembly A comprises a base plate 12 which is temporarily secured in any well known manner to the platform 10, for example, by thumb screws, not shown. Mounted on the base plate 12 is a revolvable plate 14. This latter plate is adapted to slidably rotate on the stationary base plate 12 about the O—A axis. There is also provided a thumb screw 16 for controlling a suitable clamping means, not shown, for preventing relative rotation between the plates 12 and 14 as desired. Mounted upon the revolvable plate 14 is a vertical section 18 which supports subassembly B and also carries two arcuate shaped saddle members 20.

The subassembly B comprises a pair of arcuate vertical members 22, the curvature of which matches that of the arcuate saddle members 20. A thumb screw 24 is provided for controlling a suitable clamping means, not shown, for preventing relative rotation between the movable arcuate members 22 and the stationary arcuate saddle members 20 as desired. Handles 26 are attached to each arcuate member 22 to facilitate convenient adjustment of the subassembly B about the O—B axis. Securely mounted on the movable arcuate members 22 is a horizontal flat plate 28 on which subassembly C is mounted. At one end of the plate 28 is a positioning member 30 pivotally mounted by a screw, not shown, the function of which will later become clear. At opposite sides of the plate 28 there are provided wedge members 34 and 36, the inside edges of which have sloping sides. The member 34 is permanently secured to the member 28, and the member 36 is slidably secured thereto, being made adjustable by the thumb screw 40. The subassembly C is thereby adapted to be slidably mounted upon the flat plate 28 and held firmly in position thereon by means of the cooperating wedge shaped members 34 and 36 in conjunction with the thumb screw 40.

Figure 2:
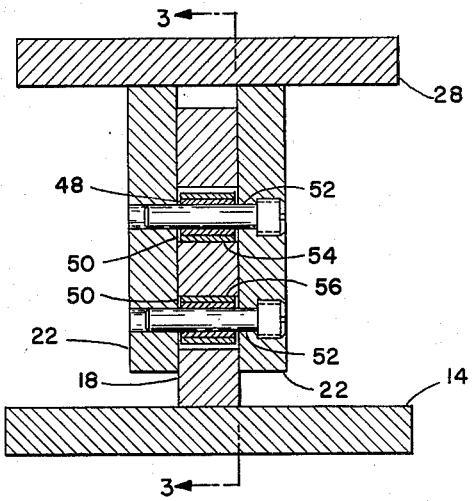
Fig. 2 is a cross sectional view showing details of construction of portions of subassemblies of the apparatus.
Figure 3:
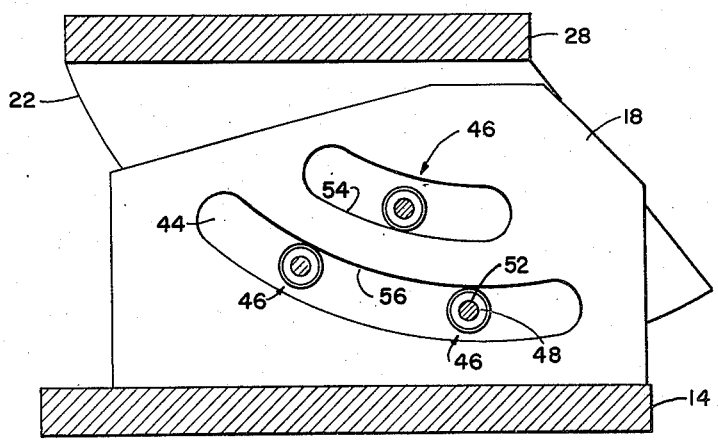
Fig. 3 is a view taken along the line 3—3 of Fig. 2.

The subassembly B further includes a special type of construction, Figs. 2 and 3, which makes possible smoother and easier adjustment of the movable portion thereof than could be achieved by prior constructions. The vertical section 18 which supports the movable arcuate members 22 is provided with two arcuate slots 42 and 44 which describe arcs of circles about the O—B axis. Adapted to ride in these slots are three roller bearings 46, one bearing being in one slot and two bearings being in the other slot. Each bearing is made of an inner section 48 of plastic sold under the trade-mark Teflon and an outer section 50 of steel, pressed together to form a single sleeve. These sleeves ride on shafts 52 which are fixedly secured to the movable arcuate members 22. As the members 22 are moved, the bearings rotate with respect to the shafts 52 and advance along the surfaces 54 and 56 of the arcuate slots on the vertical section 18, making possible smooth and easy movement of the subassembly B.

Referring again to Fig. 1, subassembly C comprises a square plate 58 having sloping sides for cooperation with the sloping sides of the wedge members 34 and 36 in holding the subassembly C in place on the plate 28. A vertical section 60 is secured to the square plate 58 and carries a cylindrical member 62 adapted to rotate therein about the O—A axis passing through its center. The cylindrical member 62 is adapted to hold a crystal specimen 64 at one end and is fitted with a knob 66 at its other end for convenient rotation. Also provided is a clamping means, not shown, which is controlled by a thumb screw 68 for holding the rotatable portion of the subassembly C stationary in any given position.

The movable portion of each subassembly A, B and C is provided respectively with a dial 70, 72, and 74, graduated in degrees which cooperates respectively with the vernier dials 76, 78, and 80 secured to stationary portions of these subassemblies for accurately measuring the angular displacement of each subassembly A, B, and C when moved about its respective axis O—A, O—B and O—C.

The platform 10 also carries a vertical column 82 which supports a light source assembly 84 and a screen 86 having perpendicular lines 88 and 90 intersecting at a point Z. The light source 84 projects a beam of light in a plane formed by the O—A and O—C axes, which impinges upon a planar surface 92 of the crystal specimen 64 and is reflected onto the screen to form a configuration of light known as a reflectogram, see Fig. 4.

Figure 4:
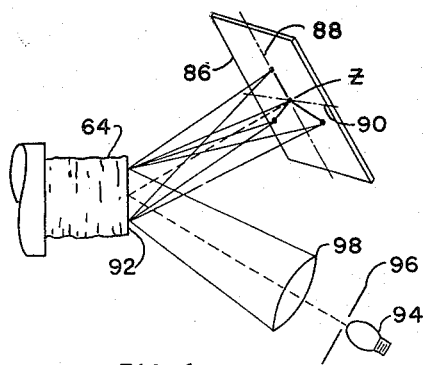
Fig. 4 is a diagrammatic view showing a light source, a screen and a crystal specimen intercepting and reflecting a light beam to cause a certain pattern of light to impinge upon the screen.

The light source assembly 84 comprises a lamp 94, a diaphragm 96 having a small aperture and a lens 98 all assembled in a suitable housing 100, Figs. 1 and 4. For sufficient reflectogram brightness, a 30 watt lamp of the concentrated arc type has been found satisfactory. With this illumination an $f\,1.9$ lens having a 50 mm. focal length can be used. By suitable arrangement of these components the light rays can be made converging or, if preferred, a parallel beam can be employed. In the latter case an advantage is achieved in that the total light travelling distance between the light source and the screen may be varied without changing the focus of the reflectogram.

In order to determine the orientation of a crystallographic plane of a crystal specimen by means of our invention, the specimen must first be ground to have a flat or planar surface, and the surface must then be etched. The etching will produce a surface composed of etch pits of microscopic size. These pits are bound by minute facets which are planes parallel to the low index crystallographic planes of the crystal lattice. A beam of light reflected from such a surface will be split into a number of components, the number being equal to the number of bounding planes comprising each single etch pit. These planes behave as tiny mirrors whose orientation with respect to the incident beam is the same for corresponding parallel surfaces of all etch pits. When the reflected beam is intercepted by a screen, a light pattern or reflectogram is seen. The shape or configuration of the reflectogram will be indicative of a certain crystallographic plane since each such plane will reflect a light pattern characteristic only of that plane. A perfectly symmetrical reflectogram precisely centered on the screen in accordance with the principles herein set forth would indicate exact coincidence of a particular crystallographic plane with respect to the planar surface on which the light beam is incident. Likewise, an unsymmetrical pattern not centered on the screen would indicate an angular deviation between the crystallographic plane having that characteristic pattern and the planar surface.

The orientation or direction of a crystallographic plane with respect to the planar surface of a crystal specimen is determined in the following manner. Preliminarily, a reference point for the center of symmetry of reflectograms must first be located on the screen 86. This is accomplished by arranging the reflecting surface of a small plane mirror in the plane formed by the intersection of the O—A and O—B axes. This can be conveniently accomplished by lifting the pivoted positioning member 30 to its vertical position and placing the mirror against the raised portion thereof. With the mirror held in this position by any suitable means, subassemblies A and B are then set to their zero or reference positions as indicated on their respective dials 70 and 72. The beam from the light source will then appear as a circular spot on the screen and the center of this spot will determine the screen reference point, designated as Z in Figs. 1 and 4. This point is marked on the screen and the small plane mirror is then removed. Lines 88 and 90, perpendicular to each other are then marked on the screen, intersecting at the point Z to facilitate orientation of the reflectograms. The vertical line 88 is drawn to lie in the plane formed by the intersection of the O—A and O—C axes and the horizontal line 90 is drawn parallel to the O—B axis.

A specimen 64, for example of germanium or silicon, ground flat and etched as indicated above, is then mounted on the cylinder 62 with the planar, etch pitted surface at the free end. It is preferable to permanently bond the specimen 64 to a piece of ceramic 63 and then bond the ceramic to the cylinder 62; in this way all of the crystal specimen can be sliced in the subsequent cutting operation without damaging the cylinder. With the thumb screw 40 loosened, the entire subassembly C is urged in a forward direction until the planar surface of the specimen flatly engages the positioning member 30 which is temporarily held in an upright position for this purpose. Upon engagement of the positioning member by the crystal, the thumb screw 40 is tightened and the positioning member is allowed to drop to its normal horizontal position. The specimen is now in position to determine the angular deviation between the planar surface and a given crystallographic plane, represented by the light pattern on the screen.

If the crystallographic plane is in exact coincidence with, or parallel to, the planar surface of the specimen, the reflectogram viewed on the screen will be symmetrical in shape, its center will coincide with the reference point Z on the screen and its center will remain at the point Z as the specimen 64 is rotated about the O—C axis by turning the knob 66.

If, however, the crystallographic plane is not parallel to the planar surface, its reflectogram will not be exactly symmetrical and further the center of the reflectogram will not remain exactly at the reference point Z when the specimen 64 is rotated by the knob 66 on subassembly C.

In order then to determine the angular deviation of the crystallographic plane from the planar surface, one of two methods may be employed. By the first method, the cylindrical member 62 on subassembly C can be rotated by the knob 66 until the center of the light pattern is bisected by either the vertical line 88 or the horizontal line 90 on the screen. Assuming the center of the pattern to be thus lined up with the vertical line 88, the thumb screw 24 is loosened, subassembly B is then displaced about the O—B axis until the center is bisected by the horizontal line 90 and the thumb screw 24 is then tightened. The angular deviation of the crystallographic plane with respect to the planar surface can then be read directly off the dial 72 on subassembly B.

By the second method, the clamp handle 16 is loosened and subassembly A is displaced about the O—A axis until the reflectogram is bisected by the vertical line 88 on the screen while the dials on the B and C subassemblies read zero; the clamp handle 16 is then tightened. The same procedure with respect to subassembly B and the horizontal line 90 on the screen will line up the center of the reflectogram with the reference point Z on the screen. Rotation of both subassemblies A and B may be required or of either, depending upon the direction of deviation of the crystallographic plane. A notation of the angular displacements as read from the scales 70 and 72 will give the angular deviation with respect to the O—A and O—B axes, respectively, and the exact direction and angular deviation of the nearest crystallographic plane with respect to the planar surface of the specimen can then be easily determined by mathematical computation or by means of charts.

With the clamps controlled by the handle 16 and the thumb screws 24 and 68 securely tightened to prevent movement of the specimen in any direction, a rotating cutting blade can now be advanced in the plane formed by the intersection of the O—A and O—B axes to slice off crystal wafers of any desired thickness. These wafers will have parallel sides which are coincident with the crystallographic plane indicated by the reflectogram seen on the screen 86 since the movement of the various subassemblies pursuant to determining the direction of the crystallographic plane necessarily orients said plane parallel to the plane formed by the O—A and O—B axes. Cuts may also be made along the length of the specimen by removing the entire subassembly C and re-inserting the plate 58 between the members 34 and 36 at 90° to its original position. Further, by positioning the specimen by rotating the knob 66, wafers having flat edges rather than a circular edge may also be cut. It will be appreciated that by suitable manipulation of the knob 66 and orientation of the plate 58 between the members 34 and 36, any desired size and shape piece may be cut from the specimen while maintaining two parallel sides of the piece in a given plane.

While we have shown and pointed out our invention as applied above, it will be apparent to those skilled in the art that many modifications can be made within the scope and sphere of our invention, as defined in the claims.

What is claimed is:

1. Apparatus for varying the position of a planar surface of a specimen of crystalline substance comprising an assembly including first, second and third subassemblies, each of said subassemblies being rotatable respectively about a first, second and third one of three mutually orthogonal axes, said third subassembly supporting said specimen and being supported by said second subassembly, said first subassembly supporting said second subassembly, said support for said second subassembly including a portion of said first subassembly in the form of a vertical plate with a pair of apertures in the form of arcuate slots each having a different radius about the axis of the second subassembly as a center, a shaft-supported roller bearing disposed in one of said slots and being in contact with one surface of said slot, a plurality of shaft-supported roller bearings spaced from each other and disposed in the other of said slots with each of said bearings in contact with one surface of said other slot, the axes of all of said shafts being substantially parallel, each bearing being rotatable on its shaft, and each shaft being secured at its ends to vertically disposed portions of said second subassembly on either side of said vertical plate, whereby when motion is imparted to said second subassembly, rotation thereof will be constrained about said second axis.

2. Apparatus for determining the orientation of a given crystallographic plane in a specimen of crystalline substance with respect to a planar surface of said specimen comprising, an assembly for defining first, second and third mutually orthogonal fixed axes, said assembly comprising first, second and third subassemblies rotatable respectively about said first, second and third axes, said third assembly supporting said specimen with said planar surface thereof passing through the intersection of said three mutually orthogonal axes, said second subassembly supporting said third subassembly, said first subassembly supporting said second subassembly, said support for said second subassembly including a portion of said first subassembly in the form of a vertical plate with a pair of apertures in the form of arcuate slots each having a different radius about the axis of the second subassembly as a center, a shaft-supported roller bearing disposed in one of said slots and being in contact with one surface of said slot; a plurality of shaft-supported roller bearings spaced from each other and disposed in the other of said slots with each of said bearings in contact with one surface of said other slot, the axes of all of said shafts being substantially parallel, each bearing being rotatable on its shaft, and each shaft being secured at its ends to vertically disposed portions of said second subassembly on either side of said vertical plate, means for directing a beam of light on said planar surface, said light being reflected from said planar surface in the form of a light pattern, and a screen positioned to intercept said light pattern, whereby said specimen is displaced about one or more of said axes to line up said light pattern with a reference point on said screen.

References Cited in the file of this patent

UNITED STATES PATENTS

| | | |
|---|---|---|
| 1,916,609 | Emmons | July 4, 1933 |
| 2,218,489 | Gerber | Oct. 15, 1940 |
| 2,313,143 | Gerber | Mar. 9, 1943 |
| 2,326,319 | Bailey | Aug. 10, 1943 |
| 2,392,528 | Fankuchen | Jan. 8, 1946 |
| 2,419,617 | Willard | Apr. 29, 1947 |
| 2,423,357 | Watrobski | July 1, 1947 |
| 2,430,969 | Young | Nov. 18, 1947 |
| 2,445,132 | Berman | July 13, 1948 |